United States Patent [19]

Lever et al.

[11] Patent Number: 5,096,871

[45] Date of Patent: Mar. 17, 1992

[54] ALUMINA-ALKALI METAL ALUMINUM SILICATE AGGLOMERATE ACID ADSORBENTS

[75] Inventors: Gordon Lever; Claude P. Etchart; Francoise Tahiani, all of Kingston, Canada

[73] Assignee: Alcan International Limited, Montreal, Canada

[21] Appl. No.: 547,586

[22] Filed: Jul. 3, 1990

[51] Int. Cl.$^5$ .............. B01J 20/08; B01J 20/10; B01J 20/04; B01D 53/04

[52] U.S. Cl. .................... 502/411; 55/71; 55/74; 210/681; 210/683; 502/263; 502/407; 502/415

[58] Field of Search ............ 502/411, 407, 414, 415, 502/263

[56] References Cited

U.S. PATENT DOCUMENTS

| | | | |
|---|---|---|---|
| 2,915,365 | 12/1959 | Saussol | 23/142 |
| 2,988,520 | 6/1961 | Braithwate | 502/263 |
| 2,996,460 | 8/1961 | Braithwate | 502/263 |
| 3,222,129 | 12/1965 | Osment et al. | 23/142 |
| 3,899,310 | 8/1975 | Chi et al. | 55/71 |
| 4,217,240 | 8/1980 | Bergna | 208/120 |
| 4,428,863 | 1/1984 | Fry | 502/263 |
| 4,539,118 | 9/1985 | Cridere | 210/683 |
| 4,639,259 | 1/1987 | Pearson | 55/71 |
| 4,717,483 | 1/1988 | Bush et al. | 210/681 |
| 4,721,696 | 1/1988 | Kidd | 502/263 |
| 4,725,361 | 2/1988 | Fleming | 210/673 |
| 4,737,478 | 4/1988 | Rainis | 502/439 |
| 4,751,211 | 6/1988 | Fleming | 502/64 |
| 4,762,537 | 8/1988 | Fleming et al. | 55/71 |
| 4,808,742 | 2/1989 | Fleming | 558/150 |
| 4,902,666 | 2/1990 | Rainis | 502/439 |

FOREIGN PATENT DOCUMENTS 1164432 3/1984 Canada.
1491563 11/1977 United Kingdom.

*Primary Examiner*—Paul E. Konopka
*Attorney, Agent, or Firm*—Cooper & Dunham

[57] ABSTRACT

Alumina-containing acid adsorbents and process for producing same. The adsorbents comprise activated alumina and an amorphous alkali (preferably sodium) aluminum silicate. The ratio of Si:Al in the amorphous material is preferably 0.25-100:1 by weight. A process for producing such adsorbents comprises treating activated alumina with a solution of an alkali metal silicate followed by an alkali metal aluminate, and forming agglomerates of the treated alumina at a temperature below about 90° C., aging the agglomerates at a temperature in the range of 20°-90° C., and calcining the aged agglomerates at a temperature in the range of 200°-500° C. The adsorbent can be used to remove acidic materials from gases and liquids during industrial processes.

19 Claims, 1 Drawing Sheet

ALUMINA-ALKALI METAL ALUMINUM SILICATE AGGLOMERATE ACID ADSORBENTS

BACKGROUND OF THE INVENTION

I. Field of the Invention

This invention relates to adsorbents used for the removal of acid components, e.g. acids and acidic materials, from gases and liquids. Most particularly, the invention relates to activated alumina-based adsorbents of this kind and to processes for the preparation of such adsorbents.

II. Description of the Prior Art

There are many industrial processes in which it is desirable to remove traces of acids and acidic materials from gases or liquids in order to avoid damage to equipment, environmental pollution or problems during recycling of a product stream to an earlier reaction.

For example, small quantities (e.g. several ppm) of HCl are produced during the catalytic reforming of low octane hydrocarbon fuels into high octane products. The reaction produces hydrogen gas which is recycled to the reforming reaction, but traces of the HCl originating from chlorides which are injected into the feed stream to regenerate the catalyst must first be removed to avoid interference with the operation and corrosion of the equipment.

Activated alumina has been used in the past as a scavenger for the removal of the small quantities of HCl from the hydrogen gas streams, but the efficiency of acid removal of this material is rather limited and there is a need for more effective and long-lived acid absorbers.

U.S. Pat. No. 4,639,259 which issued on Jan. 27, 1987 to Michael J. Pearson describes a more effective acid scavenger comprising an alkaline earth metal-promoted alumina-containing material. The preferred alkaline earth metals are said to be calcium and magnesium added to activated alumina or bauxite in a conventional manner, such as impregnation, followed if desired by shaping, e.g. nodulization or extrusion and subsequent thermal activation. While the resulting scavenger material may be more effective than activated alumina itself, it is believed that there is a need for further improvement, particularly in the effective life of the acid adsorbent, i.e. the amount of acid it can absorb before replacement or reactivation is required.

U.S. Pat. No. 4,762,537 to Fleming et. al. issued on Aug. 9, 1988 discloses an acid adsorbent formed by agglomerating alumina particles in the presence of water and Y zeolite particles. It is stated that the zeolite makes up for the rather poor acid adsorption of alumina at low concentrations. However, zeolites are rather expensive materials and the resulting adsorbents are thus not likely to gain wide acceptance for commercial operations.

Accordingly, there is a need for relatively inexpensive but nevertheless effective adsorbents for acids suitable for use in the processes mentioned above and for other procedures in which traces of acid must be removed from gases or liquids.

OBJECTS OF THE INVENTION

It is an object of the present invention to provide an adsorbent for acids and acidic materials suitable for removing traces of acids and acidic materials from certain liquids and gases.

Another object of the invention is to provide a process for producing an adsorbent of the desired type.

SUMMARY OF THE INVENTION

The present invention is based at least in part on the finding that amorphous alkali metal aluminum silicates are capable of improving the acid adsorption abilities of activated alumina and also of improving the absorption capacity of the material.

Thus, according to one aspect of the invention, there is provided an adsorbent for acids which comprises activated alumina and an alkali metal aluminum silicate.

According to another aspect of the invention, there is provided a process for producing an adsorbent for acidic materials, which process comprises treating activated alumina with a solution of alkali metal silicate and a solution of alkali metal aluminate and forming agglomerates of the treated alumina at a temperature below about 90° C., aging the agglomerates at a temperature in the range of 20°-90° C., and calcining the aged agglomerates at a temperature in the range of 200°-500° C.

The adsorbent of the present invention, at least in its preferred forms, is capable of adsorbing several kinds of acid components, for example dilute mineral acids, such as hydrogen chloride and hydrochloric acid; organic acids, ranging from formic acid to humic acids; halocarbons; and sulfides.

BRIEF DESCRIPTION OF THE DRAWING

The FIGURE is a schematic diagram of test equipment used to assess products of the invention produced according to the Examples.

DETAILED DESCRIPTION OF THE INVENTION

Figure 1:
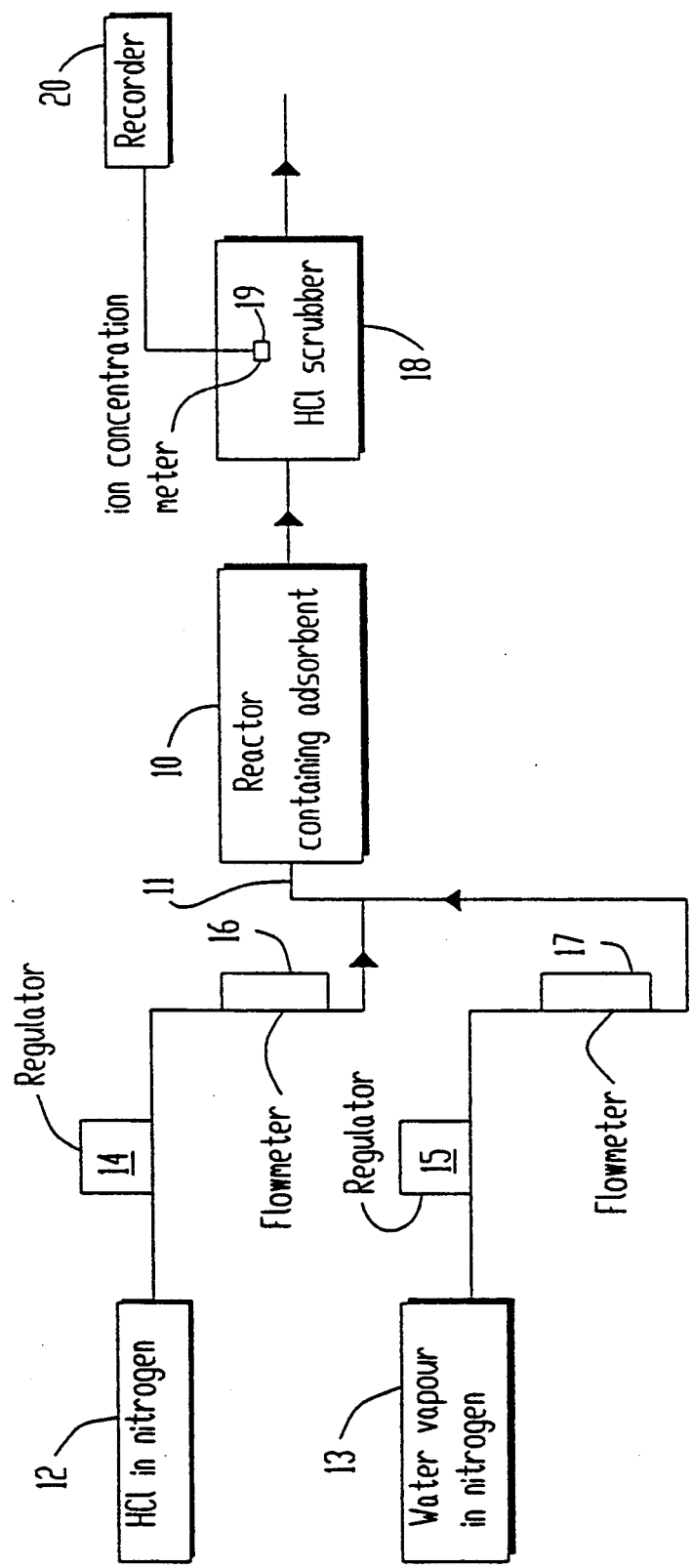

Activated alumina is a well known adsorbent that has most of its porosity in the form of micropores (20–50 Angstrom radii), a loss of ignition (LOI) of 4–10% and a specific surface area (SSA) of $>160$ m$^2$/g. The activated alumina used as a starting material in the present invention is generally a partially calcined alumina such as flash activated or otherwise partially calcined alumina having a specific surface area in the range of about 200–400 m$^2$/g. Flash activated alumina is generally formed by the rapid dehydration of alumina trihydrate produced by passing the trihydrate through a flame or hot gases for a period of from 0.5 to several seconds. The resulting alumina has a loss on ignition of about 4–10% by weight and a BET (Brunauer, Emmet and Teller) surface area of 200–300m$^2$/g. Examples of flash activation techniques can be found in U.S. Pat. Nos. 3,222,129 to Kaiser issued on Dec. 7, 1965 and 2,915,365 to Pechiney issued on Dec. 1, 1959, as well as in Canadian patent no. 1,164,432 to Sumitomo Aluminum issued on Mar. 27, 1984, the disclosures of which patents are incorporated herein by reference.

The activated alumina is preferably used in the form of particles having a size of 10 microns or less. Particles of this size can be produced by grinding larger particles either prior or subsequently to the activation step.

In the process of the present invention, the activated alumina is first treated with a solution of an alkali metal silicate and then with a solution of an alkali metal aluminate. The preferred alkali metal in these compounds is sodium but it would also be possible to sue potassium or lithium, although there would be no particular advantage to compensate for the resulting additional cost.

The alkali metal silicate and aluminate solutions are generally used in amounts which result in a Si:Al weight ratio (calculated as the equivalent amounts by weight of Si and Al introduced by the alkali metal silicate and the alkali metal aluminate, respectively, but not including Al from the activated alumina itself) in the treated material falling in the range of about 0.25-100:1, and more preferably 2-12:1. To achieve suitable ratios, the alkali metal silicate is preferably added in an amount to yield 0.5 to 5% by weight of Si based on the weight of the activated alumina, the alkali metal aluminate is preferably used in an amount to yield 0.05 to 2% by weight of Al based on the weight of the activated alumina, and the amounts of the alkali metal aluminate and silicate solutions are preferably such that the amount of alkali metal (preferably Na) is present at a concentration of 1-9% by weight based on the weight of the activated alumina.

The solutions of the alkali metal silicate and aluminate are preferably aqueous and generally have concentrations in the range of 100-600 g/l for the silicate and 50-650 g/l for the aluminate. The concentration of the solutions is to some extent important because the amount of water to be contacted with the activated alumina should preferably be limited to the range of 40-60% by weight of the alumina in order to produce suitable pellets of the adsorbent. Saturated solutions of the silicate and aluminate are therefore generally preferred. In the case of the aluminate, stabilized aqueous aluminate solutions prepared according to U.S. Pat. No. 4,252,735 issued on Feb. 24, 1981 to Handy Chemicals Ltd. may be employed if, desired. The disclosure of this patent is incorporated herein by reference.

The silicate and aluminate solutions can be added to the activated alumina with or without stirring or agitation, but as the additions are most preferably carried out at the same time as the procedure for the agglomeration of the particles of the treated material. Agglomeration can be carried out, for example, by mixing the particles of the activated alumina and the silicate solution in a pelletizer or other agglomerator and then adding the aluminate solution in several portions spaced over a period of up to about 30 minutes to avoid the generation of excess heat. An example of a suitable pelletizer is an Eirich Model R9 Batch Mixer Pelletizer operated at a speed of rotation of the pan of about 30 rpm and at a speed or rotation of the mixer rotor of about 450 to 900 rpm. When seeding (i.e. the appearance of small agglomerates) starts following the addition of all of the aluminate, water can be added, if required, depending on the wetness of the mixture and the desired size of the agglomerates. However, the amount of water should generally be kept within the range of 40-60% of the alumina weight as indicated above so that the agglomerates do not begin to disintegrate.

It is important in the process of the invention to ensure that the temperature of the mixture during the addition of the silicate and aluminate and during the agglomeration step does not rise above about 90° C., and is preferably kept within the range of about 70°-80° C., otherwise the absorption capacity of the product is reduced, possible because of too much rehydration of the activated alumina to pseudoboehmite. Heat is generated by the rehydration of the mixture during these steps and temperatures above 90° C. can quickly be exceeded if cooling is not carried out. To avoid this, the silicate and aluminate solutions can be cooled prior to use, the aluminate can be added in regular small portions as indicated above and/or the vessel can be cooled either during or prior to the mixing and agglomeration steps. Cooling of the silicate and aluminate solutions can be achieved by adding ice during the preparation of the solutions or by the use of water chillers. Cooling of the solutions to less than about 5° C. is usually sufficient to avoid excessive temperature development in the mixing and agglomeration steps.

The agglomeration step usually results in the formation of generally spherical or granular particles or pellets in the size range of 1-6 mm, and preferably of 2.3-4.7 mm or of 1-2.3 mm. However, other size ranges can be produced if required. Agglomeration is believed to take place as a result of the coalescence of the gel coated alumina particles produced by the mixing step. It is believed that the gel eventually forms strong bridges between the particles.

After formation, the agglomerates are subjected without drying to an aging treatment in order to strengthen the particles by the relatively slow process of rehydration of the activated alumina to mainly pseudoboehmite, along with other phases. The aging is carried out in a closed container (to avoid premature drying) for a period of several hours, e.g. up to 24 hours and preferably 2-8 hours. The temperature of the agglomerates during the aging step is usually in the range of 20°-90° C., more preferably 20°-60° C.,due to heat generated upon the rehydration of the particles.

Following the aging step, the agglomerates are calcined at a temperature preferably in the range of 200°-500° C., more preferably 300°-400° C. in order to produce the activated acid adsorbent. The calcination removes the physically bound water and some chemically bound water and reactivates the material. The calcination step is generally carried out in air, but could alternatively be carried out under other non-reactive gases, and usually requires a time in the range of ¼ to 4 hours, more preferably 1 to 2 hours.

The resulting agglomerated and calcined product does not contain any substantial amounts of crystalline phases that can be detected by X-ray diffraction (XRD) techniques, apart from the small amount of microcrystalline boehmite which is barely identifiable on the XRD patterns because of its low concentration. It therefore appears that the presence of the amorphous material containing an alkali metal, silicon and aluminum considerably enhances the inherent acid absorption capacity of activated alumina. The highly alkaline material containing the alkali metal, silicon and aluminum is able to neutralize acidic components and immobilize them on or within the sodium aluminum silicate coating on the activated alumina particles. X-Ray diffraction examination of spent agglomerates, after absorbing hydrogen chloride, shows the presence of alkali metal chloride, indicating that there is a reaction between the alkali metal in the amorphous sodium aluminium silicate and the hydrogen chloride.

It is believed that, in the preferred product of the invention, the amorphous compound coats the surfaces of the activated alumina even within its internal pore structure so that good acid adsorption capacity can be achieved.

The product of the invention has a high chloride removal capacity and is composed of inexpensive materials. Furthermore, the density of the material is high and therefore the absorption capacity for a given bed volume is considerable, resulting in long bed life.

The product of the invention can be used for the removal of chloride from reformer hydrogen gas as outlined at the start of this disclosure. However, it may also be used in other processes involving gases or liquids for the removal of unwanted acidity, for example in vacuum pump filtration systems for the removal of process generated acidic components that would otherwise damage the pump.

While the adsorbent of the present invention is most preferably prepared by the process indicated above, alkali metal aluminum silicates enhance the effectiveness of activated alumina for the removal of acid components when deposited on the active surfaces by other suitable techniques.

The Examples below illustrate the invention in more detail. The products produced according to the Examples were evaluated for their HCl adsorption abilities by a test procedure using the equipment shown in FIG. 1. The test involved loading reactor 10 with 5 g of sample adsorbent pellets and supplying to the reactor a gas containing 1% HCl and 0.25% water at a flow rate of 100 ml/minute through an input tube 11. The gas composition of the gas was achieved by mixing two gases, i.e. nitrogen containing HCl from a source 12 and nitrogen containing water vapour from a source 13. The respective gas flows were controlled by regulators 14 and 15 and flowmeters (e.g. rotameters) 16 and 17.

After passing through reactor 10, the gas enters a scrubbing system 18 to adsorb any unreacted HCl. The scrubbing system contains a Cl ion electrode 19 connected to an ionanalyser and display 20.

Breakthrough curves are generated by measuring the Cl ion concentration with time. After the adsorbent bed in reactor 10 is saturated with HCl, the Cl ion concentration increases rapidly. The adsorption capacity of the sample is calculated from the breakthrough curve.

EXAMPLE 1

Ground flash activated alumina (2 kg, Alcan AA101) having an average particle size of 11 microns and a specific surface area (SSA) of 270 m$^2$/g was pelletized with an Eirich laboratory batch mixer pelletizer by the addition of a solution containing 431 g of sodium silicate in 750 ml of water followed by the addition of 700 mL of an aqueous solution containing 431 g sodium silicate (Na$_2$SiO$_3$.5H$_2$O) followed by the addition of 600 mL of an aqueous solution containing 68 mL of HanFloc 45 stabilized sodium aluminate solution (17% Na$_2$O, Na$_2$O:Al$_2$O$_3$=1.15:1.0) and then 150 mL of water. The pellets were removed from the pelletizer after tumbling for b 20 minutes. After aging in a closed container for 5 hours at 90° C., the pellets were calcined at 375° C. for 1 hour.

The HCl adsorption capacity was found to be 9.5% compared to 4% for an untreated activated alumina and 7% for a competitor's material produced from a zeolite/activated alumina mixture.

EXAMPLE 2

Ground flash activated alumina (80 kg) of average particle size of 10 microns was pelletized in an Eirich plant batch pelletizer by the addition of 40 l of an ice cold solution containing 17.2 kg of sodium silicate followed by the addition of 14 l of an ice cold solution containing 2.7 l of a stabilized sodium aluminate solution (a product sold under the trade name HANFLOK 45 by Handy Chemicals Ltd. containing 17% Na$_2$O and a having a ratio Na$_2$O/Al$_2$O$_3$ of 115:1) and then of water. The exact procedure consisted of placing the alumina in the pelletizer with the sodium silicate solution, starting the pelletizer, adding 6 l of the sodium aluminate solution after 1 minute, adding 4 l of the aluminate solution after 6 minutes, adding 2 l of the aluminate solution after 8 minutes and adding the remaining 2 l of the aluminate solution after 10 minutes. Seeding had by then started (i.e. the appearance of small agglomerates). After 13 minutes, 2 l of water was added and after 16 minutes a further 2 l of water was added. The wetness of the pellets was controlled as desired either by adding up to 2 l more of water or a scoop of activated alumina. The pellets were removed after 27 minutes of tumbling, transferred to two "half 95 gallon" drums and were aged in these closed containers for 5 hours at about 60° C. and were calcined at 350° C. on a moving mesh belt gas fired calciner for one hour.

The HCl adsorption capacity of the resulting product was found to be 9.3%.

The XRD pattern of the product did not show the presence of any zeolite type materials. The product was essentially amorphous except for the presence of some microcrystalline boehmite.

In above Example 2, the sodium silicate employed was the pentahydrate (Na$_2$SiO$_3$.5H$_2$O) dissolved in ice cold water. However, it would have been possible to use instead a solution made by mixing 9.1 l of sodium silicate solution (41 degree Baume, 3.22:1 SiO$_2$:Na$_2$O) with 4.6 l of 50% by weight sodium hydroxide and adding water and ice to give a volume of 40 l and a temperature of 2°-5° C.

Instead of using the proprietary stabilized sodium aluminate solution, it would have been possible to use 14 l of a solution prepared by adding ice cold water to 2.7 l to sodium aluminate (NaAl.O$_2$) solution of density 1.52 containing 370 g/l of Al$_2$O$_3$ up to a volume of 14 l.

The amount of Si corresponds to about 2.8% by weight of the alumina employed. The amount of Al added with the sodium aluminate corresponds to about 0.66% by weight of the alumina.

Approximately 5% by weight of Na was added with the silicate and aluminate solutions.

We claim:

1. An adsorbent for acid materials in the form of agglomerates having a size in the range of 1-6 mm. comprising activated alumina having pores defined by internal surfaces and an alkali metal aluminum silicate forming a coating on said internal surfaces, said alkali metal aluminum silicate containing 0.5 to 5.0 parts by weight of Si, 0.05 to 2.0 parts by weight of Al, and 1 to 9 parts by weight of alkali metal per 100 parts by weight of activated alumina.

2. An adsorbent according to claim 1 wherein said alkali metal aluminum silicate comprises sodium aluminum silicate.

3. An absorbent according to claim 1 wherein said alkali metal aluminium silicate is amorphous.

4. An adsorbent for acidic materials in the form of agglomerates of activated alumina having a size in the range of 1-6 mm and having pores defined by internal surfaces and an alkali metal aluminum silicate forming a coating on said internal surfaces, said alkali metal aluminum silicate containing 0.5 to 5.0 parts by weight of Si, 0.05 to 2.0 parts by weight of Al, and 1 to 9 parts by weight of alkali metal per 100 parts by weight of activated alumina, said adsorbent having been prepared by treating activated alumina with a solution of alkali metal silicate and a solution of alkali metal aluminate to form a mixture, said solutions being used in such relative concentrations and amounts that said mixture contains 0.5 to 5% by weight of Si, 0.05 to 2% by weight of Al (excluding Al from said activated alumina) and 1-9% by weight of said alkali metal, based on the weight of said activated alumina, forming agglomerates in the size range of 1-6 mm from said mixture at a temperature below about 90° C., aging the agglomerates at a temperature in the range of 20°-90° C., and calcining the aged agglomerates at a temperature in the range of 200°-500° C.

5. A process for producing an adsorbent for acid materials in the form of agglomerates of activated alumina having a size in the range of 1-6 mm and having pores defined by internal surfaces and an alkali metal aluminum silicate forming a coating on said internal surfaces, said alkali metal aluminum silicate containing 0.5 to 5.0 parts by weight of Si, 0.05 to 2.0 parts by weight of Al, and 1 to 9 parts by weight of alkali metal per 100 parts by weight of activated alumina, which process comprises treating activated alumina with a solution of alkali metal silicate and a solution of alkali metal aluminate to form a mixture, said solutions being used in such relative concentrations and amounts that said mixture contains 0.5 to 5% by weight of Si, 0.05 to 2% by weight of Al (excluding Al from said activated alumina) and 1-9% by weight of said alkali metal, based on the weight of said activated alumina, forming agglomerates in the size range of 1-6 mm from said mixture at a temperature below about 90° C., aging the agglomerates at a temperature in the range of 20°-90° C., and calcining the aged agglomerates at a temperature in the range of 200°-500° C.

6. A process according to claim 5 wherein said activated alumina has a specific surface area of greater than about 160 m²/g.

7. A process according to claim 5 wherein said activated alumina is in the form of particles having a size of less than about 10 microns.

8. A process according to claim 5 wherein said alkali metal silicate is sodium silicate.

9. A process according to claim 5 wherein said alkali metal aluminate is sodium aluminate.

10. A process according to claim 5 wherein said solutions of the alkali metal silicate and the alkali metal aluminate are used in such relative amounts that a Si:Al weight ratio in said adsorbent is in the range of 0.25:100:1, excluding Al from said alumina.

11. A process according to claim 5 wherein said solutions of the alkali metal silicate and the alkali metal aluminate are used in such relative amounts that a Si:Al weight ratio in said adsorbent is in the range of 2%14 12:1, excluding Al from said alumina.

12. A process according to claim 5 wherein said solution of the alkali metal silicate is an aqueous solution containing about 100-600 g/l of said silicate.

13. A process according to claim 5 wherein said solution of the alkali metal aluminate is an aqueous solution containing about 50-650 g/l of said aluminate.

14. A process according to claim 5 wherein said solutions are aqueous and introduce an amount of water in the range of 40-60% by weight of said activated alumina during said treatment of the activated alumina.

15. A process according to claim 5 wherein said treating of said activated alumina and said formation of said agglomerates are carried out simultaneously.

16. A process according to claim 5 wherein said agglomerates are formed by carrying out said treatment of said activated alumina with said silicate and aluminate solutions in a pelletizer.

17. A process according to claim 5 wherein said temperature during said treatment and agglomeration steps is kept below 90° C. by a procedure selected from the group consisting of cooling said silicate and aluminate solutions prior to said treatment, cooling said activated alumina and said silicate and aluminate solutions during said treatment, cooling said silicate and aluminate solutions and said activated alumina during said agglomeration, and continuations thereof.

18. A process according to claim 5 wherein said aging is carried out for a period of 2-8 hours.

19. A process according to claim 5 wherein said calcining is carried out for a period of ¼ to 4 hours.

* * * * *